(12) United States Patent
Suneya

(10) Patent No.: US 8,185,792 B2
(45) Date of Patent: May 22, 2012

(54) DATA-TRANSMISSION DEVICE DATA-RECEPTION DEVICE AND DATA-TRANSMISSION-AND-RECEPTION SYSTEM

(75) Inventor: Toru Suneya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 979 days.

(21) Appl. No.: 12/140,093

(22) Filed: Jun. 16, 2008

(65) Prior Publication Data

US 2008/0313520 A1    Dec. 18, 2008

(30) Foreign Application Priority Data

Jun. 18, 2007 (JP) ................................. 2007-160223

(51) Int. Cl.
*H04L 1/18* (2006.01)
*G08C 25/02* (2006.01)
(52) U.S. Cl. ...................................................... 714/748
(58) Field of Classification Search ....... 714/4, 748–751
See application file for complete search history.

(56) References Cited

U.S. PATENT DOCUMENTS

2003/0046601 A1* 3/2003 Teng ................................. 714/4
2004/0163025 A1* 8/2004 Lakaniemi ................... 714/758

FOREIGN PATENT DOCUMENTS

| JP | 11-225168 A | 8/1999 |
| JP | 2001-274861 A | 10/2001 |
| JP | 2004-248322 A | 9/2004 |
| JP | 2005-027208 A | 1/2005 |
| JP | 2005-236909 A | 9/2005 |
| JP | 2007-013419 A | 1/2007 |

* cited by examiner

*Primary Examiner* — Guy Lamarre
(74) *Attorney, Agent, or Firm* — Canon U.S.A., Inc. IP Division

(57) ABSTRACT

A data-transmission device dividing video data into packets and transmitting the packet to a data-reception device requesting the video data includes a unit generating transmission packets based on the video data, a unit setting importance for each of the generated packets, a unit storing information about the set importance in a first storage unit, a communication unit transmitting the generated packet to the data-reception device and receiving a packet-retransmission request from the data-reception device, a unit saving the transmitted packet in a second storage unit, a unit calculating the packet-loss rate based on the received packet-retransmission request, a unit determining a packet retransmitted to the data-reception device based on the calculated packet-loss rate and the packet importance, and a retransmission unit reading the determined retransmission packet from the second storage unit and transmitting the retransmission packet to the data-reception device.

13 Claims, 6 Drawing Sheets

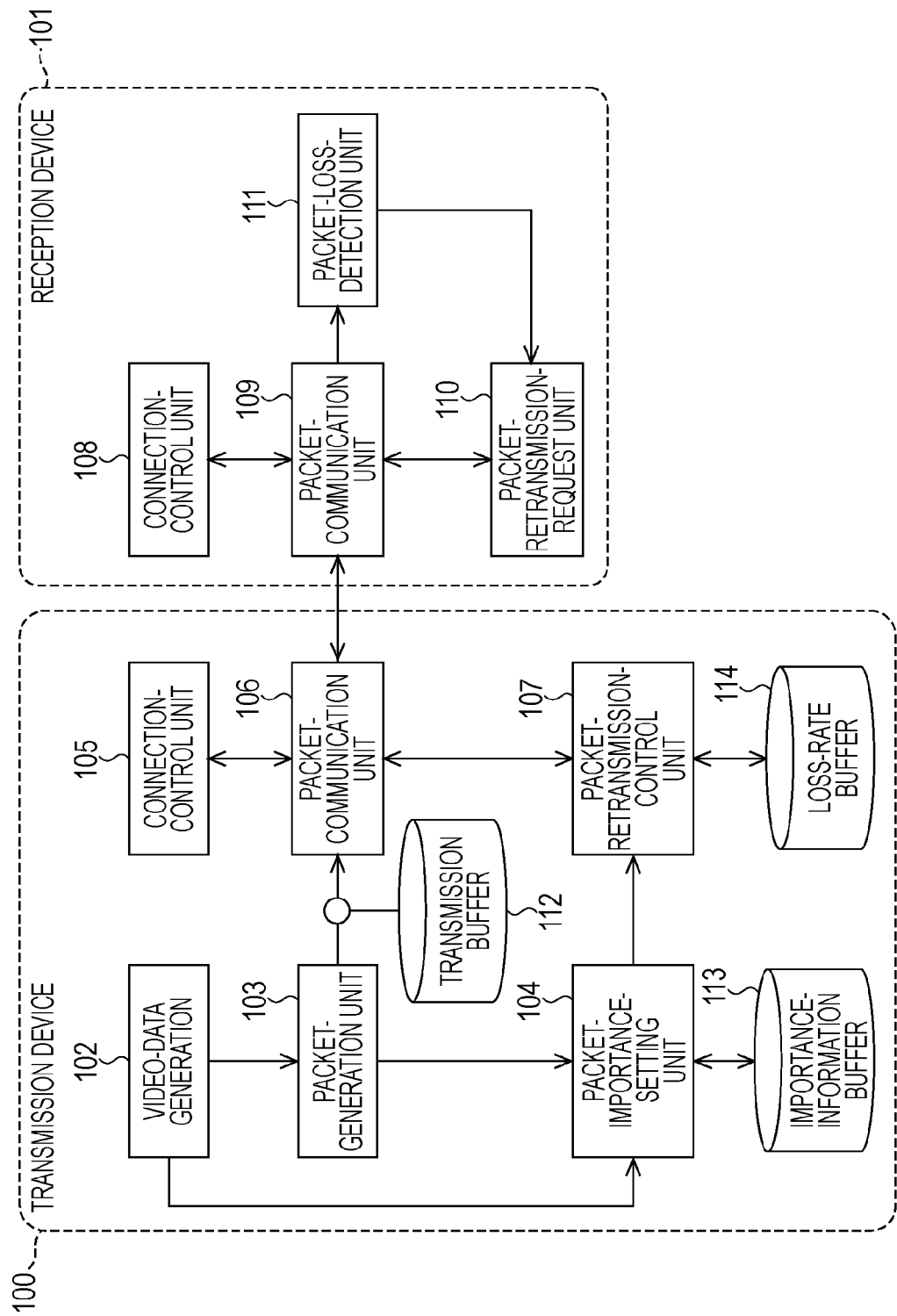

FIG. 4
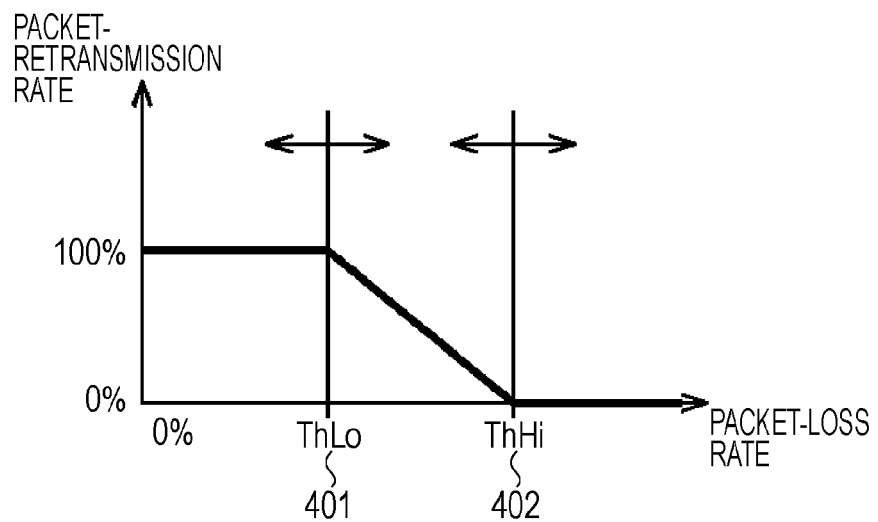
FIG. 5
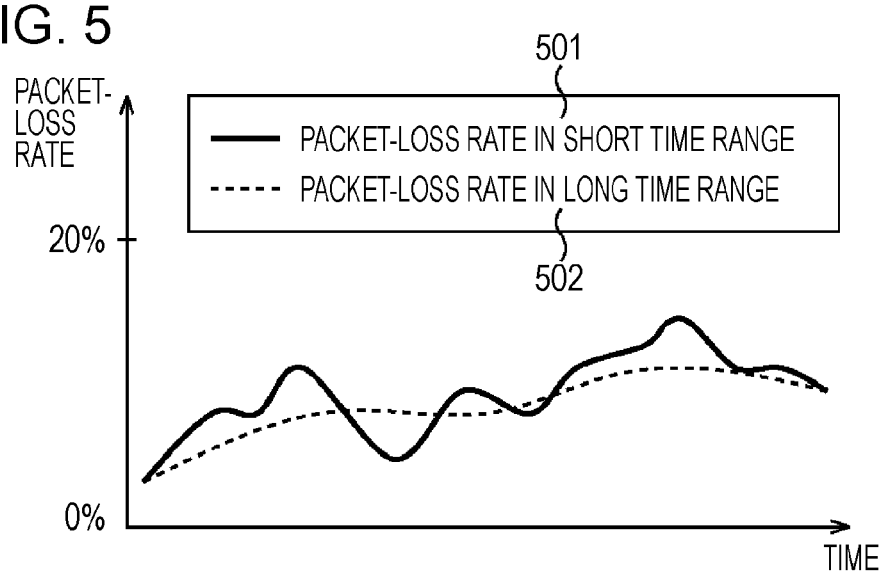
FIG. 6
| PACKET-LOSS RATE (%) | RETRANSMISSION-IMPORTANCE LEVEL |
|---|---|
| 5 - 10 | 1, 2, 3 |
| 10 - 15 | 1, 2 |
| 15 - 20 | 1 |

DATA-TRANSMISSION DEVICE DATA-RECEPTION DEVICE AND DATA-TRANSMISSION-AND-RECEPTION SYSTEM

BACKGROUND OF THE INVENTION

1. Field of the Invention

The present invention relates to a data-transmission device, a data-reception device, a data-transmission-and-reception system, a method of controlling the data-transmission device, a method of controlling the data-reception device, a program, and a recording medium, and particularly relates to a technology appropriate for controlling a retransmission operation according to the line status and/or the packet importance.

2. Description of the Related Art

As communication systems have become more advanced in recent years, it has become a common practice to view video data requiring a relatively large data-communication band via a communication line such as the Internet. A system referred to as a transport protocol for real-time applications (RTP) has been commonly used, so as to perform the above-described video-data communications. The above-described system is particularly suited for transmitting video data requiring real-time characteristics, such as live video, over a long time period. The above-described RTP is a protocol defined as RFC 1889 and RFC 1890 by the Internet engineering task force (IETF), so as to transfer audio data, video data, etc. in real time.

Generally, real-time communications typified by the above-described RTP protocol are not always performed with high data reliability. However, a low-layer protocol belonging to a low level, such as a user datagram protocol/Internet protocol (UDP/IP) which is expected to be relatively simple and attain a high communication speed has been used. The RTP is especially designed with the above-described situation in mind. Although the use of a protocol such as the above-described UDP/IP allows for attaining favorable real-time characteristics, an error such as a packet loss easily occurs due to the property of the protocol.

If the above-described error occurs, there is a high possibility that a phenomenon in which part of video data is lost, etc. occurs. Therefore, various types of schemes have been devised. For example, an arrangement designed to limit a range that would be affected by the error at the encoding time has been incorporated into compressed and encoded video data. Further, making a loss of video data inconspicuous at the reproducing time, the loss being caused by an error that had occurred, has been actually performed. Further, in the light of communications, communication lines with reliability higher than ever have been proposed so that the error rate has been significantly reduced under predetermined conditions.

On the other hand, under circumstances where errors easily occur due to heavy communications, one of important tasks is to reduce the errors. In the past, technologies of controlling a packet-transmission method and performing communications with efficiency with consideration given to the state of a network where an error occurs and/or the importance of each packet have been proposed, as technologies to reduce an error such as a packet loss. As a known example of the above-described technologies, a technology disclosed in Japanese Patent Laid-Open No. 2004-248322 allows for decreasing the rate of packets with high importance when the rate of the packet losses is high and increasing the rate of the packets with high importance when the packet-loss rate is low at the time where the importance of packets is set on the transmission side. On the other hand, when the loss of a packet for which high importance is set is detected on the reception side, a request for retransmission of the packet is transmitted from the reception side to the transmission side.

According to the technology disclosed in Japanese Patent Laid-Open No. 2004-248322, however, in addition to the packet-loss detection, the reception side has to determine the importance of a lost packet and determine whether or not a retransmission request should be made when the packet loss occurs. Consequently, the processing load placed on the reception side increases.

Further, since an arrangement designed for determining the importance of the lost packet on the reception side has to be incorporated into each packet on the transmission side, the traffic increases by as much as the incorporation. Therefore, the disclosed technology is inadequate to perform communications with efficiency.

Still further, according the technology disclosed in Japanese Patent Laid-Open No. 2004-248322, the importance is measured in two levels, namely, high and low levels, which makes it difficult to perform sophisticated retransmission control. Therefore, in the eyes of the retransmission control, the disclosed technology is still inadequate to perform communications with efficiency.

SUMMARY OF THE INVENTION

Accordingly, the present invention prevents the processing load placed on the reception side from being increased when the packet loss occurs and reduces an increase in the traffic as much as possible, so as to perform communications with efficiency.

Therefore, an image-processing apparatus according to an embodiment of the present invention includes the following configurations. Namely, according to an embodiment of the present invention, there is provided a data-transmission device that divides video data into packets and that transmits the packet to a data-reception device requesting the video data, where the data-transmission device includes a generation unit configured to generate packets for transmission based on the video data, a setting unit configured to set importance for each of the generated packets, a storage unit configured to store information about the set importance in the first storage unit, a communication unit configured to transmit the generated packet to the data-reception device and receive a request for retransmission of the packet, the request being transmitted from the data-reception device, a saving unit configured to save the packet transmitted from the communication unit in the second storage unit, a calculation unit configured to calculate the loss rate of the packet based on the packet-retransmission request received by the communication unit, a determination unit configured to determine a retransmission packet which is retransmitted to the data-reception device based on the calculated packet-loss rate and the importance set for each of the packets, where the importance information is stored in the first storage unit, and a retransmission unit configured to read the determined retransmission packet from the second storage unit and transmit the read retransmission packet to the data-reception device via the communication unit.

According to another embodiment of the present invention, there is provided a data-reception device that requests a data-transmission device to transmit video data, where the data-reception device includes a communication unit configured to receive a packet transmitted from the data-transmission device, a detection unit configured to detect at least one packet lost on a path through which communications with the data-transmission device are performed based on the packet received by the communication unit, and a retransmission-request unit configured to request the data-transmission device to retransmit the packet detected by the detection unit, wherein the communication unit receives a retransmission packet transmitted from the data-transmission device, where the retransmission packet is determined based on a loss rate of the packet and importance of each packet, according to the retransmission request made by the retransmission-request unit.

According to another embodiment of the present invention, there is provided a method of controlling a data-transmission device that divides video data into packets and that transmits the packet to a data-reception device requesting the video data, where the control method includes a generation step provided to generate packets for transmission based on the video data, a setting step provided to set importance for each of the generated packets, a storing step provided to store information about the set importance in the first storage unit, a communication step provided to transmit the generated packet to the data-reception device and receive a request for retransmission of the packet, the request being transmitted from the data-reception device, a saving step provided to save the packet transmitted at the communication step in the second storage unit, a calculation step provided to calculate the loss rate of the packet based on the packet-retransmission request received at the communication step, a determination step provided to determine a retransmission packet which is retransmitted to the data-reception device based on the calculated packet-loss rate and the importance set for each of the packets, where the importance information is stored in the first storage unit, and a retransmission step provided to read the determined retransmission packet from the second storage unit and transmit the read retransmission packet to the data-reception device.

According to another embodiment of the present invention, there is provided a method of controlling a data-reception device that requests a data-transmission device to transmit video data, where the controlling method includes a communication step provided to receive a packet transmitted from the data-transmission device, a detection step provided to detect at least one packet lost on a path through which communications with the data-transmission device are performed based on the packet received at the communication step, and a retransmission-request step provided to request the data-transmission device to retransmit the packet detected at the detection step, wherein, at the communication step, a retransmission packet transmitted from the data-transmission device is received, where the retransmission packet is determined based on a loss rate of the packet and importance of each packet, according to the retransmission request made at the retransmission-request step.

According to another embodiment of the present invention, there is provided a program making a computer divide video data into packets and transmit the packet to a data-reception device requesting the video data, where the program includes a generation step provided to generate packets for transmission based on the video data, a setting step provided to set importance for each of the generated packets, a storing step provided to store information about the set importance in the first storage unit, a communication step provided to transmit the generated packet to the data-reception device and receive a request for retransmission of the packet, the request being transmitted from the data-reception device, a saving step provided to save the packet transmitted at the communication step in the second storage unit, a calculation step provided to calculate a loss rate of the packet based on the packet-retransmission request received at the communication step, a determination step provided to determine a retransmission packet which is retransmitted to the data-reception device based on the calculated packet-loss rate and the importance set for each of the packets, where the importance information is stored in the first storage unit, and a retransmission step provided to read the determined retransmission packet from the second storage unit and transmit the read retransmission packet to the data-reception device.

According to another embodiment of the present invention, there is provided a program making a computer request a data-transmission device to transmit video data, where the controlling method includes a communication step provided to receive a packet transmitted from the data-transmission device, a detection step provided to detect at least one packet lost on a path through which communications with the data-transmission device are performed based on the packet received at the communication step, and a retransmission-request step provided to request the data-transmission device to retransmit the packet detected at the detection step, wherein, at the communication step, a retransmission packet transmitted from the data-transmission device is received, where the retransmission packet is determined based on a loss rate of the packet and importance of each packet, according to the retransmission request made at the retransmission-request step.

According to the present invention, the packet-loss rate is calculated based on a retransmission request transmitted from a data-reception device and a retransmission packet retransmitted to the data-reception device is determined based on the calculated packet-loss rate and the importance of each packet. The above-described configuration eliminates the reception side having to determine the importance of a packet which is lost due to the occurrence of a packet loss and determine whether or not a retransmission request should be issued. Further, it becomes possible to prevent the traffic from being increased due to incorporation of an arrangement designed for determining the importance of the lost packet on the reception side into each packet. Consequently, it becomes possible to prevent the processing load placed on the reception side from being increased and perform communications with efficiency.

Further, according to other features of the present invention, the importance of a packet is set based on the depth of the layer of a frame referred to when video data is decoded. Therefore, sophisticated retransmission control can be performed, which makes it possible to perform communications with efficiency higher than ever.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the present invention.

FIG. 1 is a block diagram showing an example configuration of a data-transmission-and-reception system according to a first embodiment of the present invention.

FIG. 4 shows the ratio between the packet retransmission rate and the packet-loss rate in the first embodiment.

FIG. 5 shows example changes in packet-loss rates within a relatively long time range and a relatively short time range in the first embodiment.

FIG. 6 shows an example importance level of a packet for retransmission in the case where the packet-loss rate lies between predetermined threshold values in the first embodiment.

DESCRIPTION OF THE EMBODIMENTS

First Embodiment

Figure 2A:
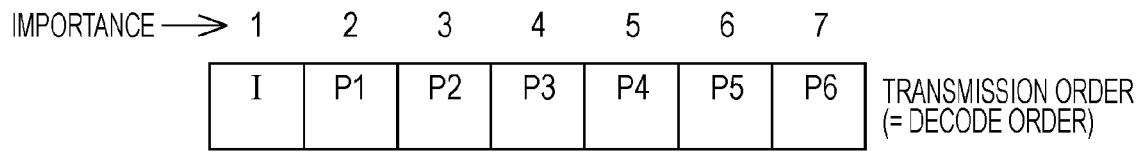
FIG. 2A illustrates one of methods of determining the importance of each frame, the methods being used for two typical types of GOPs.

A system configured to generate a packet for communications based on video data and transmit the generated packet to a reception device will be described with reference to the attached drawings, as a first embodiment of the present invention. FIG. 1 is a block diagram showing an example configuration of a data-transmission-and-reception system according to the first embodiment. The above-described data-transmission-and-reception system includes a transmission device 100 transmitting video data and a reception device 101 receiving the video data. The video data is divided into video-data items of sizes appropriate for performing communications. The video-data items are transmitted and received, as communication packets.

In the transmission device 100 shown in FIG. 1, a video-data-generation unit 102 generates video data from a conceptually functional perspective, a packet-generation unit 103 divides the generated video data into video-data items of sizes appropriate for performing communications and generates packets based on a communication protocol. Further, the packet-generation unit 103 functions as a saving unit and temporarily saves the generated packets into a transmission buffer 112, which is the second storage unit.

A packet-importance-setting unit 104 determines the level of importance of each of the generated packets. Further, the packet-importance-setting unit 104 functions as a storage unit and temporarily saves information about the importance of each of the packets into an importance-information buffer 113, which is the first storage unit. A connection-control unit 105 controls the state of connections established between the transmission device 100 and the reception device 101, and a packet-communication unit 106 transmits the generated packet to the reception device 101. Further, a packet-retransmission-control unit 107 calculates a packet-loss rate based on information about a request to retransmit a packet, the packet-retransmission-request information being transmitted from the reception device 101 via the packet-communication unit 106. Then, the packet-retransmission-control unit 107 determines whether or not the packet retransmission should be performed and temporarily saves data on the calculated packet-loss rate into a loss-rate buffer 114.

On the other hand, in the reception device 101, a connection-control unit 108 controls the state of connections established between the transmission device 100 and the reception device 101 and a packet-communication unit 109 receives a packet transmitted from the transmission device 100. Then, a packet-loss-detection unit 111 detects a packet which is lost at some midpoint of a communication path based on transmitted packets and a packet-retransmission-request unit 110 requests the transmission device 100 to retransmit the lost packet via the packet-communication unit 109. Here, a plurality of the reception devices 101 may be connected to the single transmission device 100.

Next, the flow of ordinary processing procedures performed by the data-transmission-and-reception system of the first embodiment will be described with reference to FIG. 1. First, a user transmits a request to the transmission device 100 by operating the reception device 101, so as to acquire video data from the transmission device 100. The above-described operation may be inputting the uniform resource locator (URL) of the transmission device 100 by using a graphical user interface (GUI), for example. Further, the above-described operation may be pressing a switch based on communication-connection information defined and stored in the reception device 101 in advance.

As for an instruction to acquire the video data, the connection-control unit 108 performs control so that the packet-communication unit 109 transmits a message to the transmission device 100, so as to connect to the transmission device 100. Then, the packet-communication unit 109 transmits the message asking for the connection to the packet-communication unit 106 of the transmission device 100.

In the transmission device 100, the packet-communication unit 106 receives the message asking for the connection, the message being transmitted from the reception device 101, and the connection-control unit 105 determines whether or not the connection should be established. Then, the connection-control unit 105 transmits a message indicating the result of the above-described determination to the reception device 101. One of the most commonly used methods of communicating, so as to perform the above-described connection control, is performed under a real time streaming protocol ((RTSP), RFC 2326, the Internet Society). In FIG. 1, the communication-control message is indicated by a simplified arrow for the sake of simplicity. When the RTSP is used, for example, the communication-control message is exchanged at least two times.

In the transmission device 100, next, the video-data-generation unit 102 generates video data and temporarily saves the generated video data into a predetermined buffer. Then, the video data saved into the predetermined buffer is divided into video-data items of sizes appropriate to perform communications by the packet-generation unit 103 so that communication packets including the video data are generated. The generated communication packets are saved into a transmission buffer 112 by as much as a predetermined time period, so as to be ready for the retransmission request transmitted from the reception device 101.

On the other hand, when generating a packet for transmission, the packet-importance-setting unit 104 acquires information about the type of each of video frames from the video-data-generation unit 102 and sets the importance of each of the video frames based on the acquired information about the types of the video frames and an order in which the video frames are aligned. A method of performing the above-described importance setting and the details thereof will be furnished later.

Then, the generated transmission packet is transmitted from the packet-transmission unit 106 to the packet-communication unit 109 of the reception device 101 in sequence.

Next, in the reception device 101, the packet which is lost on the communication path is detected based on the packets transmitted to the packet-communication unit 109. The above-described detection is performed by the packet-loss-detection unit 111 functioning as a detection unit. Then, if a packet loss occurs, the packet-retransmission-request unit 110 generates a message asking for retransmission of the packet for which the packet loss is detected (hereinafter referred to as a retransmission-request message). Then, the packet-communication unit 109 transmits the retransmission-request message to the packet-communication unit 106 functioning as a communication unit of the transmission device 100.

When the reception device 101 transmits the retransmission-request message generated for the packet lost on the communication path to the transmission device 100, the retransmission-request message is transmitted from the packet-communication unit 106 to the packet-retransmission-control unit 107 in the transmission device 100. Then, for the retransmission-request message, a packet for retransmission is selected and it is determined whether or not the retransmission should be performed.

At that time, the packet-retransmission-control unit 107 determines a packet which is actually retransmitted to the reception device 101 based on the rate of the packet loss, the packet-loss rate being calculated based on the retransmission-request message, information about the importance of each packet, the importance being set by the packet-importance-setting unit 104, etc. The packet-communication unit 106 functions as a retransmission unit according to the above-described determination, reads the packet saved into the transmission buffer 112 for the packet retransmission, and transmits the read packet to the reception device 101. The packet-communication unit 109 of the reception device 101 functions as a communication unit and receives the retransmission packet transmitted from the transmission device 100. Here, the transmission buffer 112, the importance-information buffer 113, and the loss-rate buffer 114 may be provided as the same storage device.

Next, the above-described method of setting the importance of each frame, the setting being performed by the packet-importance-setting unit 104, and the details thereof will be described with reference to FIGS. 2A and 2B. When video data is divided into packets and the packets are transmitted and/or received, the video data is usually compressed and encoded. The MPEG system including MPEG-2 (International Organization for Standardization (ISO)/International Electrotechnical Commission (IEC) 13818), MPEG-4 (ISO/IEC 14496), etc is a typical method of compressing and encoding the video data. According to the above-described embodiment, the video-data-generation unit 102 encodes the video data by using the above-described compressing and encoding systems. First, three types of main compression methods available for compressing each video-data item (frame) generating the video data will be described.

According to the first method of the above-described three methods, the video-data item is compressed and encoded by performing macroblock processing or the like based only on the information corresponding to a single frame. A frame compressed according to the above-described method is referred to as an intra-coded frame (I frame).

According to the second method of the above-described three methods, the video-data item is compressed and encoded by extracting difference information through motion-compensation prediction, the macroblock processing, etc. by referring to a frame provided forward on a time axis. Namely, the video-data item is compressed and encoded depending on the frame provided forward. A frame compressed through the above-described method is referred to as a predicted frame (P frame).

According to the third method of the above-described three methods, the video-data item is compressed and encoded with reference to adjacent frames on the time axis, as is the case with the P frame. The P frame is obtained only by referring to the frame provided forward. However, according to the third method, the motion-compensation prediction, the macroblock processing, etc. are performed by referring to frames straddling a target frame on the time axis. A frame compressed according to the above-described method is referred to as a bi-directional predicted frame (B frame). The above-described video frame is often referred to as a picture. In the first embodiment, however, the video frame is referred to as a frame.

Characters "I", "P", and "B" that are shown in FIG. 2 denote the I frame, the P frame, and the B frame, respectively. Each of figures added to the characters "P" and "B" is used to discriminate between frames attained through the same encoding method. Further, a group of some encoded frames is referred to as a group of pictures (GOP), or a group of video object planes (GOV). Usually, encoded video data includes a sequence of frames including a combination of a plurality of the GOPs and/or a plurality of the GOVs. Hereinafter, a group of encoded frames is referred to as the GOP.

Figure 2B:
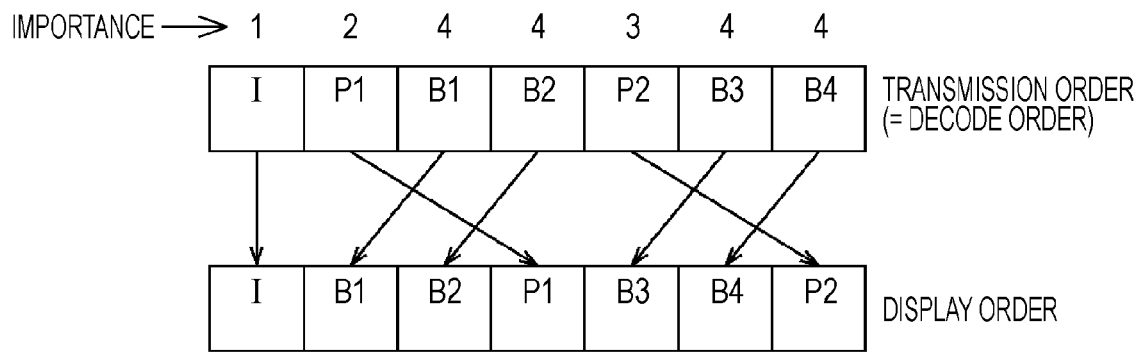
FIG. 2B illustrates the other of the methods of determining the importance of each frame, the methods being used for the two typical types of GOPs.

FIGS. 2A and 2B show methods of determining importance in the case where two typical types of GOPs are used. The first frame of the GOP shown in FIG. 2A is an I frame. The second frame of the GOP or later are P frames. For each of the P frames, only a frame ahead of the P frame is always referred to. Therefore, if information is omitted due to a packet loss or the like, the more a frame where the information omission occurs is provided forward, the more an image is affected. Consequently, according to the above-described embodiment, the importance of a frame is heightened with increasing influence of propagation of an error occurring in the frame due to the packet loss or the like. Therefore, in the GOP shown in FIG. 2A, the first frame, that is, the I frame is provided with the highest importance, and the importance of the P frames following the I frame decreases in order of transmission. Further, in each of FIGS. 2A and 2B, the importance of each frame increases as the numerical value thereof decreases. Namely, the numerical value "1" indicates the highest importance.

On the other hand, the GOP shown in FIG. 2B includes the B frames. Therefore, the order in which the B frames are transmitted (decoded) is different from the order in which the B frames are displayed on a display device, as shown in FIG. 2B. In that case, according to reference relationships between the frames, the reference relationships being established during the decoding, an I frame becomes data used to generate the first reference-source frame of frames following the I frame. Therefore, the I frame is provided with the highest importance, as is the case with the GOP shown in FIG. 2A.

The B frame is decoded by referring to frames straddling the B frame. However, a frame generated in the above-described manner is not referred to, so as to perform decoding. That is to say, since the influence of propagation of an error occurring due to the packet loss or the like is limited to the above-described frame, the B frame is provided with the lowest importance. Further, if consideration is given only to the influence of the error propagation, the B frames are provided with the same level of importance.

Further, the importance of the P frame lies halfway between those of the I frame and the B frame. Regarding the importance of the P frames, the more the P frame is provided forward on the time axis, the higher the importance of the P frame becomes, as is the case with the P frames shown in FIG. 2A. Therefore, in the GOP of which decoding order is "I-P-B-B-P-B-B", as shown in FIG. 2B, the importance of each of the frames is determined to be "1-2-4-4-3-4-4 (the importance is heightened as the numerical value thereof decreases)".

As described above, the importance is determined for each of the frames in the packet-importance-setting unit 104. Further, each time a packet storing data on the frame is generated, the importance of the packet is set. Information about the importance set for each packet is retained in the importance-information buffer 113 at least until the time where a packet temporarily saved into the transmission buffer 112 for retransmission is abandoned. FIGS. 2A and 2B show typical frame configurations of GOPs including the I frames, the P frames, and the B frames. Of course, there are other GOPs having frame configurations different from those shown in FIGS. 2A and 2B.

Thus, according to the method of setting the importance of each frame of the above-described embodiment, the importance of a GOP increases as the number of frames affected by error propagation increases when data on the frames is omitted due to a packet loss or the like, irrespective of the configuration of the GOP.

Next, a method of dividing video data including frames into video-data items of sizes appropriate for performing communications and making the video-data items into packets will be described. In the above-described embodiment, the packets are generated by using a transport protocol for real-time applications (RTP) as a system, a method, etc. used to perform data communications.

Figure 3:
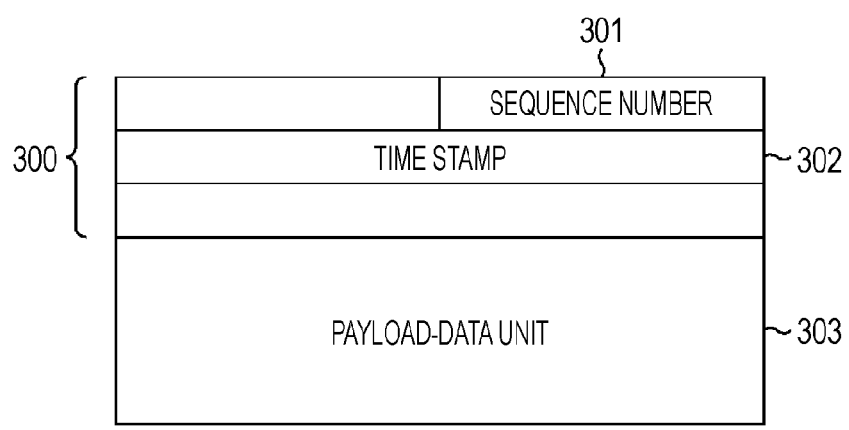
FIG. 3 is a schematic diagram of the configuration of an RTP packet.

FIG. 3 is a schematic diagram of the configuration of an RTP packet including an RTP header 300 and a payload-data unit 303. Video data generated by the video-data-generation unit 102 is divided into video-data items of sizes appropriate for performing communications in the packet-generation unit 103. At that time, the above-described video-data items are stored in the payload-data unit 303, as payload data.

Data on each of the frames included in the video data can be divided into data items of arbitrary sizes appropriate for performing communications and the data items can be made into packets. Therefore, when the frame data is decoded on the reception side, data on an original frame has to be reproduced. A sequence number 301 is given to the RTP header 300 as additional information indicating the data order, so as to provide information about the original-frame-data reproduction. Further, a time stamp 302 or the like indicating the time when decoded data on each of the frames is displayed is given to the RTP header 300. In addition to the above-described information, various information including information indicating the end of the RTP packet included in each of the frames, version information generated to RTP-packet specifications, etc. is given to the RTP header 300. However, the various information is not shown in FIG. 3 for the sake of simplicity.

Next, a method of detecting a packet loss, the method being performed by the packet-loss-detection unit 111 of the reception device 101 will be described. As described above, a packet transmitted from the transmission device 100 is the RTP packet having the configuration shown in FIG. 3. The sequence number 301 given to the RTP header 300 is expressed by a natural number incremented by one each time a packet is generated. Therefore, if an omission of a number occurs in the sequence number 301 of a transmitted RTP packet, the occurrence of the omission indicates that there is a packet which is not transmitted from the transmission side to the reception side. Namely, the occurrence of the omission indicates the occurrence of a packet loss.

Thus, the packet-loss-detection unit 111 detects the occurrence of the packet loss by monitoring the sequence number 301 of the RTP packet. Here, the order in which the packets are transmitted is often changed on the communication path. Therefore, the packet-loss-detection unit 111 detects the lost packet while accepting the change in the packet-transmission order based on a predetermined threshold value within the bounds of not affecting processing such as decoding frame data and/or packet retransmission which will be described later. Since the method of detecting the packet loss while accepting the change in the order in which the packets arrive at the reception side is not important for technologies relating to the above-described embodiment, the description thereof is omitted.

Next, a method of making a retransmission request when a packet loss occurs will be described. The packet-retransmission-request unit 110 generates a retransmission-request packet used to notify the transmission device 100 of the sequence number 301 of a lost packet detected by the packet-loss-detection unit 111. The generated retransmission-request packet is transmitted from the packet-communication unit 109 to the transmission device 100. Then, information about the retransmission-request packet transmitted to the packet-communication unit 106 is transferred to the packet-retransmission-control unit 107, and it is determined whether or not the packet should be retransmitted. According to the above-described embodiment, the retransmission-request packet is generated each time the reception device 101 detects the packet loss and the retransmission request is transmitted to the transmission device 100, as required.

Next, a method of determining whether or not the packet should be retransmitted, the determination made by the packet-retransmission-control unit 107, will be described. When the retransmission-request packet is transmitted, as described above, the packet-retransmission-control unit 107 is notified of the sequence number 301 of the packet lost on the communication path, as information about the retransmission request. The packet-retransmission-control unit 107 functions as a calculation unit and calculates a packet-loss rate per a predetermined unit time based on the sequence number 301 obtained through the notification and the number of the lost packet(s). The packet-loss rate is calculated based on the ratio between the total number of packets transmitted within a predetermined time period and the number of losses of the above-described packets, where the predetermined time period denotes a time period between the time when the retransmission-request packet is transmitted and the time preceding the time when the retransmission-request packet is transmitted by as much as a fixed time period.

FIG. 4 shows the ratio between the calculated packet-loss rate and the packet retransmission. For calculating the packet-loss rate, two types of numerical values are calculated, as shown in FIG. 5, where the numerical values include a packet-loss rate 501 indicating packets lost within a relatively short time range and a packet-loss rate 502 indicating packets lost within a long time range.

When the value of the packet-loss rate 501 corresponding to the short time range is equivalent to and/or less than a threshold value ThLo 401 shown in FIG. 4, the transmission device 100 responds to every request to retransmit a packet. On the contrary, when the value of the packet-loss rate 501 is equivalent to and/or more than a threshold value ThHi 402, the transmission device 100 does not respond to the retransmission request. Further, if the value of the packet-loss rate 501 falls in the range between the threshold value ThLo 401 and the threshold value ThHi 402, the transmission device 100 selects a packet for which the retransmission request is issued based on the packet-retransmission rate and the importance of each of the packets.

FIG. 6 shows the importance level of a packet for retransmission in the case where the packet-loss rate 501 corresponding to the short time range lies between the threshold ThLo 401 and the threshold value ThHi 402. The importance (the retransmission-importance level) shown in FIG. 6 increases as the numerical value thereof decreases. For example, when the packet-loss rate falls within the 10%-to-15% range, a packet of which importance is from "1" to "2" is retransmitted. Even though a retransmission request is issued for a packet of which importance has a numerical value of "3" or more, the packet is not retransmitted.

Here, the packet-loss-rate ranges and/or the set values of the retransmission-importance level shown in FIG. 6 are provided as an example and do not indicate absolute values of the packet-retransmission control performed according to the above-described embodiment. Further, the threshold value ThLo 401 and the threshold value ThHi 402 may be dynamically changed according to the value of the packet-loss rate 502 corresponding to the long time range. For example, if the packet loss rate 502 corresponding to the long time range is relatively low, each of the threshold values may be shifted to the right, and if the packet loss rate 502 corresponding to the long time range is relatively high, each of the threshold values may be shifted to the left.

Consequently, when the packet-loss rate 502 corresponding to the long time range is low even though the packet-loss rate 501 corresponding to the short time range is not changed, the number of packets retransmitted in response to the retransmission requests increases. On the contrary, when the packet-loss rate 502 corresponding to the long time range is high and the packet-loss rate 501 corresponding to the short time range is not changed, the number of packets retransmitted in response to the retransmission requests decreases. According to the above-described method, retransmission of packets can be controlled with consideration given to the congestion state of the communication path.

Figure 7:
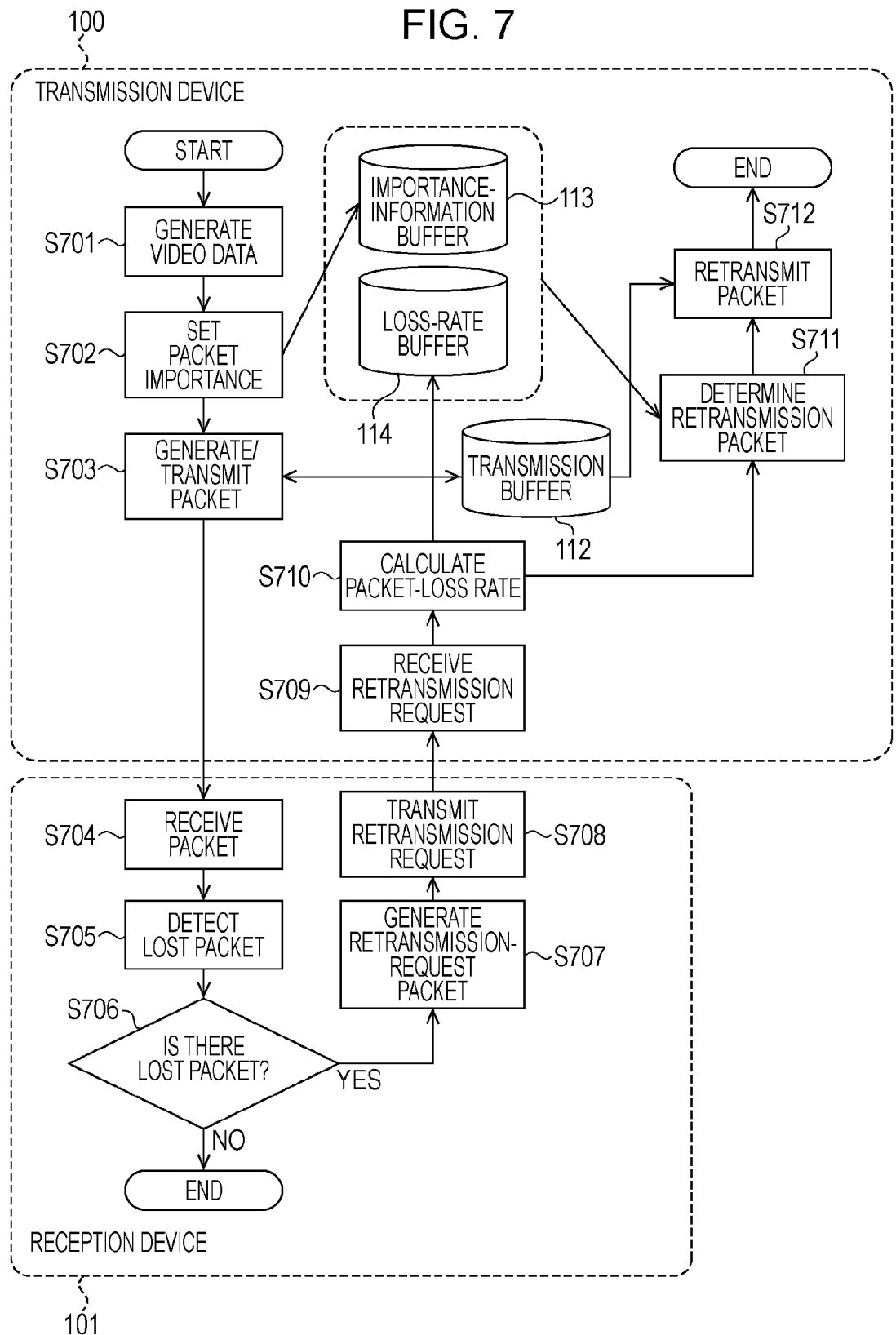
FIG. 7 is a flowchart illustrating example processing procedures relating to packet-retransmission control performed in the first embodiment.

Thus, the above-described embodiment has been described in detail with an emphasis on the system-configuration diagram shown in FIG. 1. However, the flow of processing procedures relating to the packet-retransmission control will be described again for the sake of clarity with reference to a flowchart shown in FIG. 7. Namely, the flowchart shown in FIG. 7 illustrates example processing procedures relating to the packet-retransmission control performed according to the above-described embodiment.

When transmission and/or reception of video data is started, the video-data-generation unit 102 of the transmission device 100 generates video data, at step S701. Next, the packet-importance-setting unit 104 determines the importance of each of frames based on the degrees of influences of the error propagation traceable to a reference-frame layer, the influence degrees being estimated based on the type of generated frames and/or the GOP configuration, and sets importance for each of packets, where each of the packets is divided into frames. Then, information about the importance set for each of the packets is temporarily saved into the importance-information buffer 113, at step S702. Then, the packet-generation unit 103 generates a packet and the packet-communication unit 106 transmits the generated packet to the reception device 101, at step S703.

Next, the packet-communication unit 109 of the reception device 101 receives the packet, at step S704. Then, the packet-loss-detection unit 111 detects a packet loss, at step S705. Next, it is determined whether or not there is a lost packet through the detection performed at step S705, at step S706.

If the result of the above-described determination indicates that there is the lost packet, the packet-retransmission-request unit 110 generates a packet used to request for retransmission of the lost packet, at step S707. Then, the packet-communication unit 109 transmits the retransmission-request packet to the transmission device 100, at step S708. On the other hand, if the result of the determination made at step S706 indicates that there is no lost packet, the retransmission request is not required, so that the processing procedures are finished at that point.

Next, the packet-communication unit 106 of the transmission device 100 receives the retransmission-request packet, at step S709. Then, the packet-retransmission-control unit 107 calculates the packet-loss rate and temporarily saves data on the calculated packet-loss rate into the loss-rate buffer 114, at step S710. The packet-loss rate calculated at step S710 includes, for example, two types of packet-loss rates, that is, the packet-loss rate 501 corresponding to a short time range of from several seconds to several dozen seconds and the packet-loss rate 502 corresponding to a long time range of from a minute to several minutes.

Next, the importance information corresponding to the sequence number 301 of the packet for which the retransmission request is issued is acquired from the importance-information buffer 113 and information about the above-described two types of packet-loss rates is acquired from the loss-rate buffer 114. Then, the packet-retransmission-control unit 107 functions as a determination unit and determines a packet for retransmission based on the above-described acquired information, at step S711. Then, the packet-communication unit 106 acquires the retransmission packet determined by the packet-retransmission-control unit 107 from the transmission buffer 112 and transmits the acquired packet to the reception device 101, at step S712. Then, the processing procedures are finished.

According to the above-described flow of the processing procedures, what should be done on the part of the reception device 101 is only detecting a loss of a packet transmitted from the transmission device 100 and transmitting a retransmission request to the transmission device 100, as required. On the other hand, the packets are retransmitted from the transmission device 100 to the reception device 101 in decreasing order of importance according to the network status.

Thus, according to the above-described embodiment, the packet-retransmission-control unit 107 calculates the packet-loss rate based on the retransmission request transmitted from the reception device 101. Then, a retransmission packet retransmitted to the reception device 101 is determined based on the calculated packet-loss rate and the importance set for each packet, the importance being set by the packet-importance-setting unit 104. The above-described configuration eliminates the reception device 101 having to determine the importance of a packet which is lost due to the occurrence of a packet loss and determine whether or not a retransmission request should be issued. Further, it becomes possible to prevent the traffic from being increased due to incorporation of an arrangement designed for determining the importance of a lost packet through the reception device 101 into each packet. Consequently, it becomes possible to prevent the processing load placed on the reception side from being increased and perform communications with efficiency.

Second Embodiment

Figure 8:
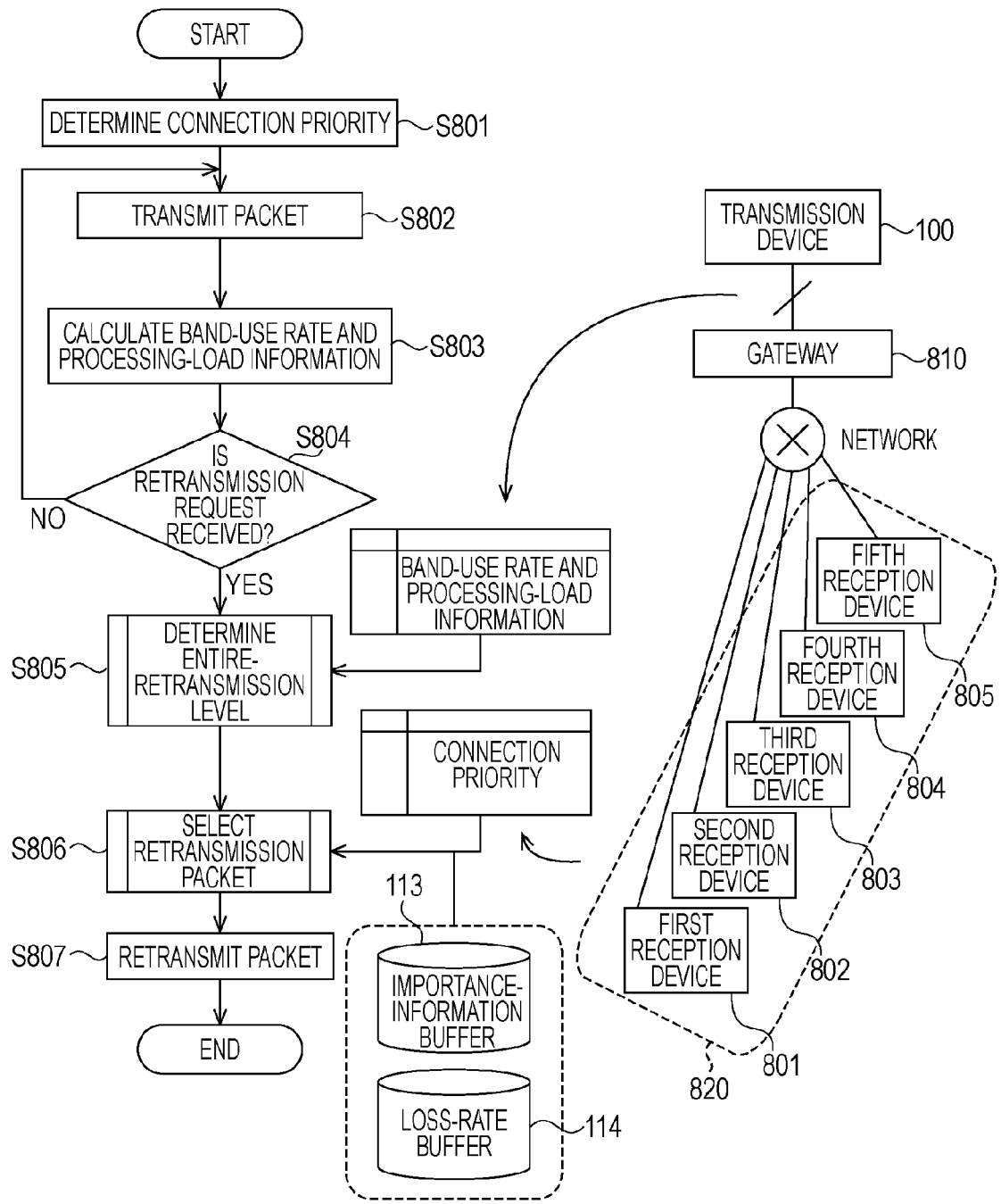
FIG. 8 is a flowchart showing example processing procedures performed to achieve the packet-retransmission control in the case where plural reception devices are connected to a single transmission device according to a second embodiment of the present invention.

Next, according to a second embodiment of the present invention, plural reception devices are connected to the transmission device 100. FIG. 8 is a schematic diagram showing plural reception devices 820 connected to the transmission device 100 and a flowchart mainly showing example processing procedures performed to achieve the packet-retransmission control on the transmission side.

In the second embodiment, the transmission device 100 sets the entire packet-retransmission level based on a band-use rate of a path through which the transmission device 100 is connected to an external network and/or the processing load placed on the transmission device 100. Further, a packet for retransmission is selected with consideration given to priority set for each of the first reception device 801, the second reception device 802, the third reception device 803, the fourth reception device 804, and the fifth reception devices 805, each packet-loss rate, and so forth. Since the functional configurations of the transmission device 100 and the first to fifth reception devices 801 to 805 are the same as those of the first embodiment, the description thereof is omitted.

The flow of the above-described processing procedures will be described with reference to FIG. 8. First, when the reception devices 820 are connected to the transmission device 100, the connection-control unit 105 of the transmission device 100 sets connection priority for each of the first to fifth reception devices 801 to 805, at step S801.

Next, when a transmission request is transmitted from the reception device 101, a packet including video data is transmitted, so as to start transmission of the video data, at step S802. Then, the connection-control unit 105 calculates the band-use rate of the path through which the transmission device 100 is connected to the external network and the processing load placed on the transmission device 100, as required, at step S803.

The processing-load information is provided as a factor responsible for fluctuations in the processing load placed on the transmission device 100 when the video data (packet) is transmitted from the transmission device 100 to the plural reception devices 820. For example, the processing-load information may include information about the number of the reception devices connected to the transmission device 100, information about the bit rate of transmitted video data, etc. Further, the band-use rate denotes the use rate of a band between a gateway 810 connecting to an external path to which the reception devices 820 are connected and the transmission device 100.

Next, it is determined whether or not a retransmission request is transmitted from each of the reception devices 820, at step S804. If the result of the determination shows that no retransmission request is transmitted, the processing returns to step S802. On the other hand, if the result of the determination made at step S804 shows that the retransmission request is transmitted, the entire retransmission level is set based on the band-use rate and the processing-load information obtained on the part of the transmission device 100 at that time, at step S805. According to the above-described embodiment, the entire basic retransmission level is controlled based on the entire retransmission level calculated based on the band-use rate and/or the processing-load information obtained on the part of the transmission device 100 in addition to the retransmission-importance level calculated with consideration given to the priority of each of the reception devices 820.

Next, a packet for actual retransmission is selected based on the entire retransmission level set at step S805, the connection priority of each of the reception devices 820, and information stored in the importance-information buffer 113 and the loss-rate buffer 114.

Figure 9:
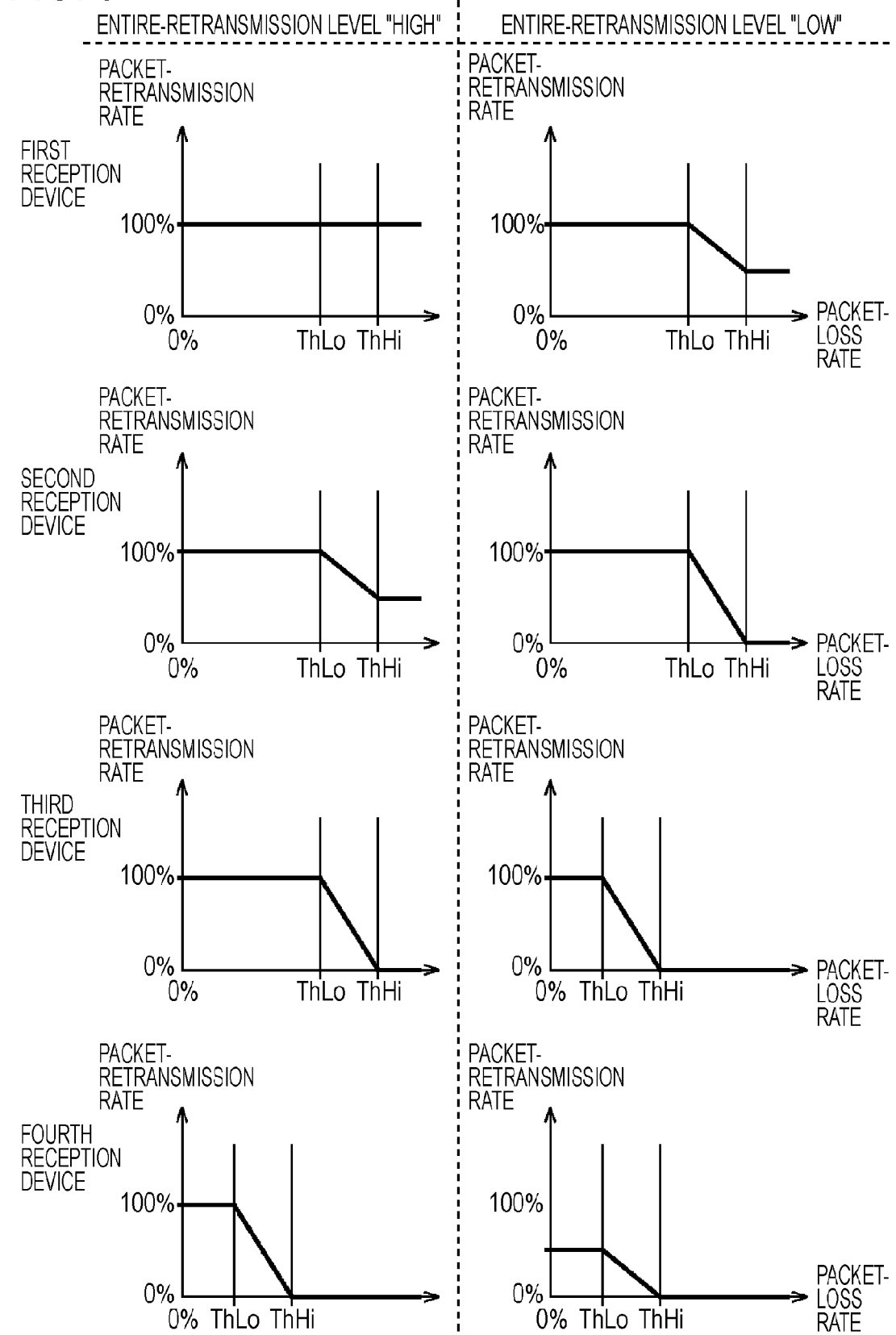
FIG. 9 shows example changes occurring in the rates of packet retransmission performed by reception devices connected to a single transmission device, where the changes occur due to changes in the entire-retransmission level.

Here, a method of selecting the packet for retransmission, the selection being performed at step S806, will be described with reference to FIG. 9. FIG. 9 shows example changes occurring in the rates of the packet retransmission performed by the reception devices 820 in the case where the plural reception devices 820 are connected to the single transmission device 100, where the changes occur due to changes in the entire-retransmission level.

The connection priorities assigned to the first to fourth reception devices 801 to 804 are different from one another, and the connection priority assigned to the first reception device 801 is the highest of all of the connection priorities. Then, the connection priority decreases in the order presented as the second reception device 802-the third reception device 803-the fourth reception device 804, and the connection priority assigned to the fourth reception device 804 is the lowest of all of the connection priorities. If the entire retransmission level is relatively high at that time, namely, if the state of a communication line is relatively good at that time, the packet-retransmission rate of each of the first to fourth reception devices 801 to 804 is set based on the connection priorities, as shown in the left part of FIG. 9.

The above-described packet-retransmission rate is changed according to the entire retransmission level. When the entire retransmission level is reduced, the packet-retransmission rate is reduced, as shown in the right part of FIG. 9. For example, the first reception device 801 shown in FIG. 9 responds to every packet-retransmission request when the entire retransmission level is high. However, when the entire-retransmission level is reduced, the packet-retransmission rate is reduced with increases in the packet-loss rate within the range between the threshold value ThLo and the threshold value ThHi.

The method of changing the above-described packet-retransmission rate includes, as shown in FIG. 9, the method of changing the values of the threshold value ThLo and the threshold value ThHi, the method of changing the packet-retransmission rate without changing the threshold values, and the method of using the above-described two methods in combination.

Further, as is the case with the first embodiment, information is read from each of the loss-rate buffer 114 storing information about the packet-loss rate of each of the reception devices and the importance-information buffer 113 storing information about the importance of lost packets. Then, a packet for retransmission is finally determined based on the read information and the packet-retransmission rate, at step S806. Then, at the next step S807, the packet is retransmitted to each of the first to fourth reception devices 801 to 804 and the processing procedures are finished.

Thus, the plural reception devices 820 are connected to the single transmission device 100 in the above-described embodiment. Therefore, consideration is given to the band-use rate and/or the processing load placed on the transmission device 100 when the packet for retransmission is determined. Further, the importance of the packet for retransmission is changed according to the priority of each of the reception devices 820. Further, the importance of each packet is set and managed on the part of the transmission device 100, as is the case with the first embodiment. Consequently, even though plural reception devices are connected to a single transmission device, it becomes possible to control priorities of the reception devices with stability, perform communications with efficiency, and provide high-quality contents.

Other Embodiments

The object of the present invention is to provide a storage medium storing program code of software for implementing the functions of the above-described embodiments to a system and/or an apparatus. The above-described object can also be achieved by reading and executing the program code stored in the storage medium through a computer (a central processing unit (CPU) and/or a microprocessing unit (MPU)) of the system and/or the apparatus. In that case, the program code itself read from the storage medium achieves the functions of the above-described embodiments and a computer-readable-storage medium storing the program code constitutes the present invention.

The storage medium for providing the program code may be, for example, a flexible disk, a hard disk, an optical disk, a magneto-optical disk, a compact disk (CD)-read-only memory (ROM), a CD-recordable (R), a magnetic tape, a nonvolatile memory card, a ROM, a digital-versatile disk (DVD), etc.

Furthermore, not only by the computer reading and executing the program code, but also by the computer executing part of or the entire actual process utilizing an operating system (OS), etc. running on the computer based on instructions of the program code, the functions of the above-described embodiments may be achieved.

Further, the program code read from the storage medium may be written into a memory of a function-expansion board inserted into the computer and/or a function-expansion unit connected to the computer. The functions of the above-described embodiments may be achieved by executing part of or the entire actual process based on instructions of the program code through a CPU or the like of the function-expansion board and/or the function-expansion unit.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-160223 filed on Jun. 18, 2007, which is hereby incorporated by reference herein in its entirety.

What is claimed is:

1. A data-transmission device that divides video data into packets and that transmits the packet to a data-reception device requesting the video data, the data-transmission device comprising:
a generation unit configured to generate packets for transmission based on the video data;
a setting unit configured to set importance for each of the generated packets;
a storage unit configured to store information about the set importance in a first storage unit;
a communication unit configured to transmit the generated packet to the data-reception device and receive a request for retransmission of the packet, the request being transmitted from the data-reception device;
a saving unit configured to save the packet transmitted from the communication unit in a second storage unit;
a calculation unit configured to calculate a loss rate of the packet based on the packet-retransmission request received by the communication unit;
a determination unit configured to determine a retransmission packet which is retransmitted to the data-reception device based on the calculated packet-loss rate and the importance set for each of the packets, where the importance information is stored in the first storage unit; and
a retransmission unit configured to read the determined retransmission packet from the second storage unit and transmit the read retransmission packet to the data-reception device via the communication unit.
wherein the communication unit transmits the packet of the video data to a first data-reception device for which a first connection priority is set and a second data-reception device for which a second connection priority is set, and
wherein in a case where the loss rate of the packet in the first data-reception device which is calculated by the calculation unit is equal to the loss rate of the packet in the second data-reception device which is calculated by the calculation unit, the determination unit determines that a first retransmission packet is to be transmitted and a second retransmission packet is not to be transmitted, the first retransmission packet being based on a packet-retransmission request from the first data-reception device for which the first connection priority is set, the second retransmission packet being based on a packet-retransmission request from the second data-reception device for which the second connection priority is set lower than the first connection priority, and the second retransmission packet having the same level of importance as the first retransmission packet.

2. The data-transmission device according to claim 1, wherein the video data is data which is compressed and encoded under a motion-picture-experts-group system.

3. The data-transmission device according to claim 1, wherein the setting unit sets the importance for each frame of the video data and the storage unit stores information about the importance set for each of the frames in the first storage unit for each packet.

4. The data-transmission device according to claim 1, wherein when frames of the video data are compressed by extracting information about a difference between the frames, the setting unit sets the importance based on a depth of a layer of a frame referred to when the video data is decoded.

5. The data-transmission device according to claim 1, wherein the calculation unit calculates the packet-loss rate based on a number of at least one packet lost on a communication path within a predetermined time period, where the number of the lost packet is obtained based on the packet-retransmission request received by the communication unit.

6. The data-transmission device according to claim 1, wherein the determination unit determines the retransmission packet by controlling a rate of at least one packet for retransmission based on a band-use rate and a processing load placed on the data-transmission device.

7. A data-reception device that requests a data-transmission device to transmit video data, the data-reception device comprising:
a communication unit configured to receive a packet transmitted from the data-transmission device;
a detection unit configured to detect at least one packet lost on a path through which communications with the data-transmission device are performed based on the packet received by the communication unit; and a retransmission-request unit configured to request the data-transmission device to retransmit the packet detected by the detection unit, wherein the communication unit receives a retransmission packet transmitted from the data-transmission device, where the retransmission packet is determined based on a loss rate of the packet and importance of each packet, according to the retransmission request made by the retransmission-request unit, wherein the data-transmission device transmits the packet of the video data to the data-reception device for which a first connection priority is set and a second data-reception device for which a second connection priority is set, and wherein in a case where the loss rate of the packet in the data-reception device is equal to a loss rate of the packet in the second data-reception device, the data-transmission device transmits the retransmission packet according to the retransmission request made by the retransmission-request unit and determines not to transmit a second retransmission packet, the second retransmission packet being based on a packet-retransmission request from the second data-reception device for which the second connection priority is set lower than the first connection priority, and the second retransmission packet having the same level of importance as the retransmission packet.

8. The data-reception device according to claim 7, wherein the detection unit detects at least one packet lost on a communication path by referring to a numerical value of which information is stored for each packet received by the communication unit, where the numerical value indicates an order of the received packet.

9. The data-reception device according to claim 7, wherein the retransmission-request unit notifies the data-transmission device of a numerical value used to identify the packet detected by the detection unit.

10. A method of controlling a data-transmission device that divides video data into packets and that transmits the packet to a data-reception device requesting the video data, the control method comprising:

generating packets for transmission based on the video data;

setting importance for each of the generated packets;

storing information about the set importance in a first storage unit;

transmitting the generated packet to the data-reception device and receiving a request for retransmission of the packet, the request being transmitted from the data-reception device;

saving the generated packet in a second storage unit;

calculating a loss rate of the packet based on the packet-retransmission request;

determining a retransmission packet which is retransmitted to the data-reception device based on the calculated packet-loss rate and the importance set for each of the packets, where the importance information is stored in the first storage unit; and reading the determined retransmission packet from the second storage unit and transmitting the read retransmission packet to the data-reception device, wherein the transmitting further comprises transmitting the packet of the video data to a first data-reception device for which a first connection priority is set and a second data-reception device for which a second connection priority is set, and wherein in a case where the loss rate of the packet in the first data-reception device is equal to the loss rate of the packet in the second data-reception device, the determining further comprises determining that a first retransmission packet is to be transmitted and a second retransmission packet is not to be transmitted, the first retransmission packet being based on a packet-retransmission request from the first data-reception device for which the first connection priority is set, the second retransmission packet being based on a packet-retransmission request from the second data-reception device for which the second connection priority is set lower than the first connection priority, and the second retransmission packet having the same level of importance as the first retransmission packet.

11. A computer-readable storage medium storing a program configured to execute the method of claim 10.

12. A method of controlling a data-reception device that requests a data-transmission device to transmit video data, the controlling method comprising:

receiving a packet transmitted from the data-transmission device;

detecting at least one packet lost on a path through which communications with the data-transmission device are performed based on the packet received at the receiving; and requesting the data-transmission device to retransmit the packet detected at the detecting, wherein, at the receiving, a retransmission packet transmitted from the data-transmission device is received, where the retransmission packet is determined based on a loss rate of the packet and importance of each packet, according to the retransmission request made at the requesting, wherein the data-transmission device transmits the packet of the video data to the data-reception device for which a first connection priority is set and a second data-reception device for which a second connection priority is set, and wherein in a case where the loss rate of the packet in the data-reception device is equal to a loss rate of the packet in the second data-reception device, the data-transmission device transmits the retransmission packet according to the retransmission request made at the requesting and determines not to transmit a second retransmission packet, the second retransmission packet being based on a packet-retransmission request from the second data-reception device for which the second connection priority is set lower than the first connection priority, and the second retransmission packet having the same level of importance as the retransmission packet.

13. A computer-readable storage medium storing a program configured to execute the method of claim 12.

* * * * *